(12) United States Patent
Liu et al.

(10) Patent No.: US 10,891,514 B2
(45) Date of Patent: Jan. 12, 2021

(54) IMAGE CLASSIFICATION PIPELINE

(71) Applicant: Microsoft Technology Licensing, LLC, Redmond, WA (US)

(72) Inventors: Youjun Liu, Palo Alto, CA (US); Ji Li, Sunnyvale, CA (US); Amit Srivastava, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 62 days.

(21) Appl. No.: 16/222,905

(22) Filed: Dec. 17, 2018

(65) Prior Publication Data

US 2020/0193218 A1   Jun. 18, 2020

(51) Int. Cl.
*G06K 9/62* (2006.01)
*G06K 9/00* (2006.01)
*G06N 3/08* (2006.01)

(52) U.S. Cl.
CPC ....... *G06K 9/6227* (2013.01); *G06K 9/00986* (2013.01); *G06N 3/08* (2013.01)

(58) Field of Classification Search
CPC ........... G06K 9/00986; G06K 9/00993; G06K 9/6227; H04N 21/2405; G06N 3/08
See application file for complete search history.

(56) References Cited

U.S. PATENT DOCUMENTS

| 8,015,564 | B1 | 9/2011 | Beyer et al. |
| 9,465,994 | B1* | 10/2016 | Mishra ............... G06K 9/00791 |
| 2012/0268492 | A1* | 10/2012 | Kasahara ........... G06K 9/00993 345/633 |

| 2014/0321759 | A1* | 10/2014 | Kamiya ............... G06K 9/6215 382/217 |

(Continued)

FOREIGN PATENT DOCUMENTS

WO   2018155963 A1   8/2018

OTHER PUBLICATIONS

"TensorFlow Serving for Model Deployment in Production", Retrieved from: https://web.archive.org/web/20181017014052/https://www.tensorflow.org/serving/, Oct. 17, 2018, 2 Pages.

(Continued)

*Primary Examiner* — Katrina R Fujita

(57) ABSTRACT

The present disclosure relates to processing operations configured for an image recognition pipeline that is used to tailor real-time management of image recognition processing for technical scenarios across a plurality of different applications/services. Image recognition processing is optimized at run-time to ensure that latency requirements are met so that image recognition processing results are returned in a timely manner that aids task execution in an application-specific instances. An image recognition pipeline may manage a plurality of image recognition models that comprise a combination of image analysis service (IAS) models and deep learning models. A scheduler of the image recognition pipeline optimizes image recognition processing by selecting at least: a subset of the image recognition models for image recognition processing and a device configuration for execution of the subset of image recognition models, in order to return image recognition results within a threshold time period that satisfies application-specific execution.

20 Claims, 4 Drawing Sheets

(56) References Cited

U.S. PATENT DOCUMENTS

| | | | |
|---|---|---|---|
| 2015/0130689 A1* | 5/2015 | Sugden | G06T 7/194 |
| | | | 345/8 |
| 2016/0086029 A1* | 3/2016 | Dubuque | G06Q 30/0207 |
| | | | 382/159 |
| 2016/0259978 A1* | 9/2016 | Jeong | G06K 9/00718 |
| 2017/0228616 A1* | 8/2017 | Tasdizen | G06K 9/00664 |
| 2018/0322365 A1 | 11/2018 | Yehezkel Rohekar | |
| 2018/0330238 A1* | 11/2018 | Luciw | G06N 3/0445 |
| 2018/0336411 A1 | 11/2018 | Schuh | |
| 2018/0336479 A1* | 11/2018 | Guttmann | G06T 7/97 |
| 2019/0042529 A1* | 2/2019 | Nurvitadhi | G06N 3/0635 |
| 2019/0130223 A1* | 5/2019 | Anderson | G06F 16/5838 |
| 2019/0163978 A1* | 5/2019 | Yang | G06K 9/628 |
| 2019/0205649 A1* | 7/2019 | Ananthanarayanan | |
| | | | G06K 9/6269 |
| 2019/0220697 A1* | 7/2019 | Kiemele | G06K 9/00335 |
| 2019/0288911 A1* | 9/2019 | Amini | G06K 9/00771 |
| 2019/0340521 A1* | 11/2019 | Liu | G06F 16/9535 |
| 2020/0265153 A1 | 8/2020 | Li et al. | |

OTHER PUBLICATIONS

"International Search Report and Written Opinion Issued in PCT Application No. PCT/US19/064566", dated Jan. 28, 2020, 12 Pages.

"International Search Report and Written Opinion Issued in PCT Application No. PCT/US2020/016616", dated May 4, 2020, 14 Pages.

"Artificial Intelligence and Privacy", Retrieved From: https://www.datatilsynet.no/globalassets/global/english/ai-and-privacy.pdf, Jan. 31, 2018, pp. 1-30.

Fischer, et al., "Combining Offline and Online Classifiers for Life-Long Learning", In Proceedings of International Joint Conference on Neural Networks, Jul. 12, 2015, 8 Pages.

McMahan, et al., "Communication-Efficient Learning of Deep Networks from Decentralized Data", In repository of arXiv, arXiv:1602.05629v3, Feb. 28, 2017, 11 Pages.

Nishio, et al., "Client Selection for Federated Learning With Heterogeneous Resources in Mobile Edge", In repository of arXiv, arXiv:1804.08333, Apr. 23, 2018, 7 Pages.

\* cited by examiner

100

IMAGE CLASSIFICATION PIPELINE

BACKGROUND

Image analysis services are utilized to analyze image data to aid processing of image data for applications/services. However, image analysis processing often requires a tremendous amount of computational resources to build, maintain and operate image analysis modeling. For a single user image, multiple deep learning models are typically executed together with other image analyzers to generate image recognition results for the user image. This type of processing is so comprehensive, a graphics processing unit (GPU) is typically required execute image analysis, which is costly from a resource perspective as well as a latency perspective. As such, traditional image analysis processing is not optimal for real-time (or near real-time) processing of image data, for example, where results are required almost immediately to aid application execution.

Further technical issues result from the fact that image analysis modeling is not typically configured to work across a software-based platform that comprises a plurality of applications/services. For example, different applications/services may have different inputs and parameters that are most important to image analysis processing for application-specific purposes. This can require developers specifically code each individual instance for application-specific image analysis processing making it unlikely that such processing can be adapted on the fly to select specific image analysis modeling in different technical application-specific scenarios.

SUMMARY

In view of the foregoing technical challenges, the present disclosure relates to processing operations configured for an image recognition pipeline that is used to tailor real-time management of image recognition processing for technical scenarios across a plurality of different applications/services. In examples described herein, image recognition processing is optimized at run-time to ensure that latency requirements are met so that image recognition processing results are returned in a timely manner that aids task execution in an application-specific instances. An image recognition pipeline may manage a plurality of image recognition models that comprise a combination of image analysis service (IAS) models and deep learning models. A scheduler of the image recognition pipeline optimizes image recognition processing by selecting at least: a subset of the image recognition models for image recognition processing and a device configuration for execution of the subset of image recognition models, in order to return image recognition results within a threshold time period that satisfies application-specific execution.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
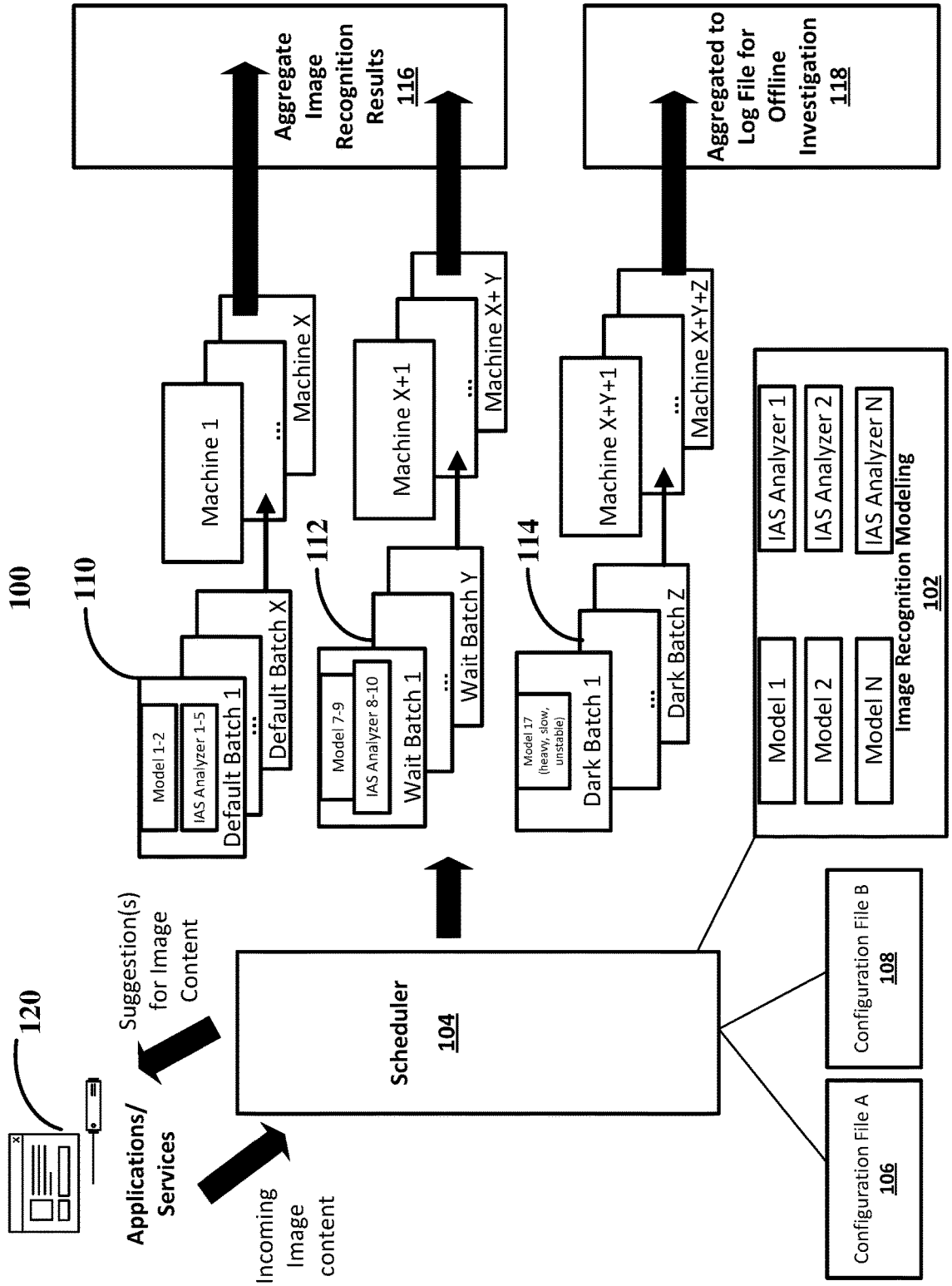
FIG. 1 illustrates an exemplary process flow providing exemplary components usable for an image recognition pipeline with which aspects of the present disclosure may be practiced.

The present disclosure relates to processing operations configured for an image recognition pipeline that is used to tailor real-time management of image recognition processing for technical scenarios across a plurality of different applications/services. As an example, image recognition processing is optimized at run-time to ensure that latency requirements are met so that image recognition processing results are returned in a timely manner that aids task execution in an application-specific instances. An image recognition pipeline may manage a plurality of image recognition models that comprise a combination of image analysis service (IAS) models and deep learning models. A scheduler of the image recognition pipeline optimizes image recognition processing by selecting at least: a subset of the image recognition models for image recognition processing and a device configuration for execution of the subset of image recognition models, in order to return image recognition results within a threshold time period that satisfies application-specific execution.

Non-limiting technical examples of the present disclosure describe technical scenarios where an image recognition pipeline manages image recognition processing for a plurality of different applications/services. The image recognition pipeline pre-loads configuration file data that enables a scheduler of the image recognition pipeline schedule image recognition processing for a plurality of different applications/services as well as customize scheduling image recognition processing for application-specific scenarios. A plurality of image recognition models may be available to assist with image recognition processing, where the image recognition pipeline is configured to identify one or more batches (e.g., a subset) of the image recognition models to run to obtain image recognition results within a specific time frame. For instance, say that a user is creating a slide in a presentation application/service using image content. The image recognition pipeline is configured to detect application-specific usage of the image content and select a configuration for image recognition processing that can return image recognition results within a time frame that is most relevant for user activity within the presentation application/service. For example, a slide design suggestion for the image content may be generated from image recognition results before the user navigates away from the slide that the user is working on. If an image recognition result is not timely received, a suggestion for the image content may no longer be of value to the task at hand that the user is performing.

Batches of image recognition models may be executed in an order (e.g., one after another), in parallel, in part (e.g., partially stopped due to inefficient processing) or not at all (e.g., in instances where image recognition results have already been retrieved and computational resources are not required to execute additional processing). In examples where image recognition results are returned faster than expected, the image recognition pipeline is configured to propagate image content (and prior obtained image recognition results) for additional image recognition processing to generate richer image recognition results. In other examples, a batch of image recognition models for heavier image recognition processing, requiring a larger amount of resources and creating a larger amount of latency before image recognition results are obtained, may be also identified. The image recognition pipeline may segregate out this type of processing so that it may be executed but the results are not required to immediately return a useful image recognition result for application-specific. Such image recognition processing may still be useful to the image recognition pipeline such as those where: suggestions are not time-sensitive and may be generated after a longer period of time; image recognition results are used to generate additional suggestions (e.g., where alternative suggestions are generated for a user); and for offline management to assist with improving image recognition modeling (e.g., log data, training), among other examples.

Management of the image recognition pipeline does not require that developers extensively code specific application scenarios and execute a larger number of files at run-time. Alternatively, the image recognition pipeline is managed through configuration data. Configuration data may comprise one or more configuration files that the image recognition pipeline can preload to enable execution of processing operations described herein. In one example, the image recognition pipeline utilizes two configuration files for scheduling of image recognition processing. For instance, a first configuration file may provide data that comprises data for managing the plurality of image recognition models and a second configuration file may provide data that comprises application-specific parameters for image recognition analysis of image content. A scheduling component of the image recognition pipeline utilizes the first configuration file and the second configuration file to select the subset of image recognition models and select the device configuration that optimizes image recognition processing in application-specific scenarios.

Developers are only required to identify configuration data for accessing image recognition modeling and configuration data that provides application-specific parameters for execution of image recognition modeling. Through training operations, the image recognition pipeline can adaptively sort image recognition models into batches for operation of image recognition processing as well as further optimize image recognition processing for application-specific time requirements through selection of a device configuration for execution of image recognition processing. Management of image recognition modeling in this manner also enables the image recognition pipeline to more scalable and extensible, as compared with traditional image recognition infrastructures, where new models can be incorporated into the image recognition pipeline without requiring any more than update to the configuration data.

Exemplary technical advantages provided by processing described in the present disclosure comprise but are not limited to: creation and implementation of an exemplary image recognition pipeline; generation of configuration data for implementation of the image recognition pipeline; an ability to organize image recognition models into different batches for optimization of image recognition processing; an ability to adapt device configurations to optimize image recognition processing; proactive generation of suggestions based on image recognition processing; proactive notification of suggestions on behalf of a user; ability to service a plurality of applications/services through an image recognition pipeline; improved processing efficiency (e.g., reduction in processing cycles, saving resources/bandwidth) for computing devices during image recognition processing; extensibility to tailor processing operations described herein across a plurality of different applications/services; reduction in latency during image recognition processing; and improving usability of applications/services through provision of suggestions associated with image content, among other technical advantages.

FIG. 1 illustrates an exemplary process flow 100 providing exemplary components usable for an image recognition pipeline, with which aspects of the present disclosure may be practiced. As an example, components of process flow 100 may be executed by an exemplary computing system (or computing systems) as described in the description of FIG. 4. Exemplary components, described in process flow 100, may be hardware and/or software components, which are programmed to execute processing operations described herein. In one example, components of process flow 100 may each be one or more computing devices associated with execution of a specific service. Exemplary services may be managed by an application platform that also provides, to a component, access to and knowledge of other components that are associated with applications/services described herein. In one instance, processing operations described in process flow 100 may be implemented by one or more components connected over a distributed network. Operations performed in process flow 100 may correspond to operations executed by a system and/or service that execute computer programs, application programming interfaces (APIs), neural networks or machine-learning processing, language understanding processing, search and filtering processing, and generation of content for presentation through a user interface of an application/service, among other examples. In the illustration of process flow 100, there are process flow steps that are aimed at emphasizing non-limiting examples of interaction between components shown in FIG. 1. Process flow between components may be altered without departing from the spirit of the present disclosure.

An exemplary image recognition pipeline comprises one or more components that manage: interfacing with applications/services; process flow for scheduling of image recognition processing of image content; retrieval of image recognition results; and generation of suggestions based on results of image recognition processing. The image recognition pipeline may interface with image recognition modeling 102 that comprises a plurality of image recognition models used to execute image recognition processing. The plurality of image recognition models may comprise image analysis service (IAS) models; deep learning models; and/or a combination thereof. Examples of IAS models as well as deep learning models and processing for creation and implementation of such models are known to one skilled in the field of art.

IAS models are trained models that execute image recognition processing. Image analysis is utilized to process image content into fundamental components to extract statistical data that is utilized to make determinations about the image content. Non-limiting examples of tasks executed by IAS models comprise but are not limited to: finding shapes, detecting edges, line identification; shadow detection;

removing noise, counting objects, identifying grouping/clustering of objects, identifying specific features (e.g., facial features); classifying an object; and measuring region and image properties of an object, among other examples. As an example, a feature vector (or vectors) may be created to model different features of image content and correlate the features of the image content with what is already known by a model. IAS models may be any type of modeling including machine learning modeling, neural network modeling and convolutional neural network modeling, among other examples. In some examples, specific IAS models may be trained to evaluate specific attributes of image content, where the image recognition pipeline may select to apply certain IAS models before implementing other types of IAS models. For instance, an IAS model may be trained for facial recognition processing. If the image recognition pipeline detects that a user is using a social networking application/service that relies on facial recognition of users, the image recognition pipeline may prioritize an IAS model for facial recognition in a first batch of models that are utilized for image recognition processing before scheduling an IAS model that is configured to analyze more general features of image content.

Deep learning modeling comprises machine learning modeling that adds layers of complexity for analyzing image content, providing additional layers of convolutional analysis as compared with traditional machine learning modeling or neural network modeling. Deep learning models may be configured specifically as models for image analysis and/or may be models providing additional analysis (e.g., entity evaluation, processing of accompanying signal data) to aid in the generation of suggestions for image content. Examples of deep learning modeling comprises convolutional neural networks or the like. Deep learning modeling is more computationally intensive modeling as compared with IAS modeling, where IAS modeling may be considered more light-weight machine learning modeling. As deep learning modeling is more computationally intensive, greater latency is created for image recognition processing when deep learning modeling is utilized as compared with IAS modeling. As such, in some examples, the image recognition pipeline is configured to schedule application of specific deep learning models based on application-specific time periods for relevance of returning image recognition results. In other examples, the image recognition pipeline executes deep learning modeling in parallel with morel lightweight IAS modeling, where the image recognition pipeline may not wait for the image recognition results from the deep learning modeling when providing an initial suggestion for usage of image content.

The image recognition pipeline may employ a scheduler 104 to manage application of the image recognition modeling 102. The scheduler 104 is a component that may arrange various IAS models and deep learning models of the image recognition modeling 102 into applicable batches for execution based on an application-specific scenario in which image content is being utilized. For instance, the scheduler 104 is configured to interface with applications/services 120 in which image content may be accessed and/or utilized. Applications/services 120 may be any type of programmed software. An exemplary application/service 120 is a productivity application/service that is configured for execution to enable users to complete tasks on a computing device, where exemplary productivity services may be configured to work with image content in different application-specific scenarios. Examples of productivity services comprise but are not limited to: word processing applications/services, spreadsheet applications/services, notes/notetaking applications/services, authoring applications/services, digital presentation applications/services, search engine applications/services, email applications/services, messaging applications/services, web browsing applications/services, collaborative team applications/services, digital assistant applications/services, webpage building applications/services, directory applications/services, mapping applications/services, calendaring applications/services, electronic payment applications/services, file storage and synchronization applications/services, digital data storage or distributed data storage applications/services, web conferencing applications/services, call communication applications/services, camera applications/services, audio/video applications/services, language understanding applications/services, bot framework applications/services, networking applications/service, and social networking applications/services, among other examples. In some examples, an exemplary productivity application/service may be a component of an application platform providing a suite of productivity applications/services. An application platform suite is configured to providing access to a plurality of applications/services 120, thereby enabling cross-application/service usage to enhance functionality of a specific application/service at run-time. As productivity features may span a wide variety of functionality, contextual relevance evaluation is configured to identify specific productivity features that are most relevant to a context in which a user is accessing an electronic document. Moreover, specific application/services 120 as well as application platform suites may be configured to interface with other non-proprietary application/services (e.g., third-party applications/services) to extend functionality including productivity feature suggestion and implementation.

Based on application-specific scenarios analyzed by the scheduler 104, the image recognition modeling 104 may arrange the order in which specific models of the image recognition modeling 102 is applied to obtain results in a time frame that aids with application/service processing. For example, the scheduler 104 may analyze a timing requirement associated with the application/service 120 and a latency for execution of individual image recognition models to assist with organizing batches of image recognition models for application. Batches comprise a selection of a subset of one or more of the image recognition models. As referenced in the foregoing description, batches of image recognition models may be executed in an order (e.g., one after another), in parallel, in part (e.g., partially stopped due to inefficient processing) or not at all (e.g., in instances where image recognition results have already been retrieved and computational resources are not required to execute additional processing). In examples where image recognition results are returned faster than expected, the image recognition pipeline is configured to propagate image content (and prior obtained image recognition results) for additional image recognition processing to generate richer image recognition results. In other examples, a batch of image recognition models for heavier image recognition processing, requiring a larger amount of resources and creating a larger amount of latency before image recognition results are obtained, may be also identified. The image recognition pipeline may segregate out this type of processing so that it may be executed but the results are not required to immediately return a useful image recognition result for application-specific. Such image recognition processing may still be useful to the image recognition pipeline such as those where: suggestions are not time-sensitive and may be generated after a longer period of time; image recognition results are used to generate additional suggestions (e.g., where alternative suggestions are generated for a user); and for offline management to assist with improving image recognition modeling (e.g., log data, training), among other examples.

Image recognition models (of the image recognition modeling 102) may be accessible over a network connection, for example, in a service-implementation. The scheduler 104 may select a device configuration to optimize operation of batch processing, where different device configurations may be selected for different batches. The scheduler 104 may interface with image recognition models, over the network connection, to provide applicable data for image recognition processing and receive image recognition results. In some examples, one or more of the image recognition models may be models built and maintained by a provider of application platform. In other examples, image recognition models may be provided by third-party providers, where the scheduler 104 may interface with third-party applications/services to access specific image recognition models. For instance, the scheduler 104 may enable interfacing with deep learning frameworks that support inferences for Linux® and Python® including but not limited to: Microsoft® CNTK®; TensorFlow®; Pytorch®, Caffee®, among other examples.

Management of the image recognition pipeline does not require that developers extensively code specific application scenarios and execute a larger number of files at run-time. Alternatively, the image recognition pipeline is managed through configuration data. Configuration data may comprise one or more configuration files that the image recognition pipeline can preload to enable execution of processing operations described herein. In one example, the image recognition pipeline utilizes two configuration files for scheduling of image recognition processing. For instance, the scheduler 104 may create and utilize a first configuration file (configuration file A 106) providing data that comprises data for managing the plurality of image recognition models. Configuration file A 106 may be configured to provide data for available image recognition models that may be utilized by the scheduler for the execution of image recognition processing. Non-limiting examples of data provided in configuration file A 106 comprise but are not limited to: data/metadata for device configurations for device infrastructures available to execute image recognition processing and/or other machine learning modeling (e.g., available bandwidth and computing resources); data to interface with applications/services to access image recognition models for retrieval of image recognition results; state information for specific image recognition models (e.g., indication of whether image recognition models are on/off for image recognition processing; indication of model training and whether a specific model is undergoing training/update); data/metadata indicating classification of image recognition models (e.g., lightweight, deep learning); and data/metadata indicating processing requirements of specific image recognition models, complexity of specific image recognition modeling including latency for image recognition processing by specific image recognition models, etc. While examples reference a single version of configuration file A 106, it is to be understood that related configuration data may be separated into multiple configuration files, for example, to aid processing efficiency, without departing from the spirit of the present disclosure.

In one example, the scheduler 104 is a component of an application platform that manages access to a plurality of applications/services provided through the application platform, where the scheduler 104 manages image recognition processing for individual applications/services of the application platform. An example of an application platform is Microsoft® Office365®. Traditionally, there is limited support for Microsoft® Windows® server operating system (OS) when it comes to integration of image recognition models with existing server infrastructure. Many image recognition models do not support the Window server OS from open source code. To overcome such technical challenges, the scheduler 104 is configured to provide data to enable any server environment of an application platform to interface with any type of image recognition framework including deep learning frameworks. Configuration file A 106 may comprise data including file wrappers that enable a native software library for devices of an application platform to interface with image recognition processing frameworks that are coded in different programming languages. For example, a machine learning library for an application platform may be coded in a first programming language (e.g., C++), where a file wrapper may be generated and utilized to enable interfacing with frameworks that are coded in a second programming language (e.g., C #).

Additional challenges exist where many of the computing devices (e.g., servers) that would be used to execute image recognition processing are central processing unit (CPU) machines that do not provide GPU support. GPU processing capabilities are typically required to execute deep learning modeling due to the amount of computing resources required for such operations. The scheduler 104 is configured to work with an existing device infrastructure of an application platform to enable efficient image recognition processing on CPU devices. For instance, image recognition modeling may be built upon one or more CPU devices. CPU devices may be physical machines and/or virtual machines. As identified above, configuration file A 106 comprises data/metadata for device configurations for device infrastructures available to execute image recognition processing and/or other machine learning modeling (e.g., available bandwidth and computing resources). This data, along with data/metadata indicating processing requirements of specific image recognition models may be cross-referenced data in configuration file B 108, comprising, application-specific time requirements associated with returning timely suggestions to a user through an application/service 120, to optimize image recognition processing for an applications-specific scenario.

The scheduler 104 may further be configured to create and manage a second configuration file (configuration file B 108) providing data that comprises application-specific parameters for image recognition analysis of image content. As identified in the foregoing description, the scheduler 104 is configured to interface with a plurality of different applications/services, where different applications/services 120 may have different processing requirements based on the type of tasks that are executing within specific applications/services. Non-limiting examples of application-specific parameters for image recognition processing comprises but are not limited to: identification of specific applications/services; identification of tasks that involve usage of image content through applications/services; application-specific time requirements associated with returning timely suggestions to a user through an application/service; application-specific signal data that may be utilized to assist with generation of suggestions for image content and proactive surfacing of suggestions; classification of type of application/service; and priority preferences for execution of specific image recognition models in application-specific scenarios, among other examples. Configuration data for multiple applications/services may be stored in a single configuration file (configuration file B 108) or multiple configuration files to assist processing efficiency during run-time operation. When access is detected to a specific application/service, data configuration file B 108 may be accessed (and cross-referenced with data in configuration file A 106) to assist the scheduler 104 with optimizing run-time implementation of image recognition modeling 102.

The scheduler 104 is configured to identify incoming image content and optimize the image recognition modeling 102 for image recognition processing of the image content based on an application-specific scenario in which the image content is being utilized. In some examples, configuration data (e.g., configuration file A 106 and configuration file B 108) may be accessed when user access is detected to an application/service. For instance, the scheduler 104 proactively pulls up configuration data, before the data is actually needed, that enables the configuration data to be preloaded to improve efficiency when determining a setup for run-time image recognition processing. In one example, the scheduler 104 may be configured to detect usage of image content through an application/service 120, which may be a proactive trigger for executing image recognition processing on behalf of a user. In other instances where image recognition processing is not time-sensitive, image recognition processing may be performed offline and results and/or suggestions surfaced in response to detected usage of image content through applications/services or in offline scenarios to enable image content suggestions to be surfaced during subsequent access to an application/service 120.

In any example, the scheduler 104 is configured to group the image recognition models (of the image recognition modeling 102) into batches for run-time execution. Essentially, the scheduler 104 divides inference tasks into multiple tasks to be executed in different machines and the results are merged downstream to increase processing efficiency at run-time. In doing so, the scheduler 104 utilizes the configuration data (e.g., configuration file A 106 and configuration file B 108) to select subset(s) of image recognition models for specific batch execution as well as select a device configuration that optimizes image recognition processing for application-specific scenarios. Examples of batches are illustrated in process flow 100, which comprises a default batch 110, a wait batch 112 and a dark batch 114. However, it is to be understood that any number of batches may be created to optimize image recognition processing without departing from the spirit of the present disclosure. Selection of image recognition models for batch division may be based on analysis of the configuration data (e.g., application-specific parameters, priorities of image recognition models). In one example, latency determinations in execution of image recognition models are utilized to segregate image recognition models into batches. For instance, a threshold latency requirement (e.g., results returned in less than 10 milliseconds; results returned in less than 30 milliseconds; results returned in less than 50 milliseconds) may be create that separates image recognition models into batches.

An example default batch 110 is a first subset of image recognition models that are selected to execute image recognition processing. The default batch 110 is a grouping of one or more image recognition models that is prioritized to run in an application-specific scenario. The image recognition models that are selected for the default batch 110 may vary based on the application-specific scenario that is detected. The configuration data may be analyzed to select image recognition models that are to be included in the default batch 110. Training and prior modeling analysis, executed through a machine learning model associated with the scheduler 104, may yield determinations as to which models to include in a default batch 110 when processing image content for a specific application/service. For instance, image recognition models that are eligible to be included in the default batch 110 may comprise active, stable models that have been tested and tuned prior to implementation. Such models may also have thresholds for accuracy in image recognition processing. In further examples, application-specific parameters may be utilized to select a subset of image recognition models that may be ran in the default batch 110 processing. Say that a user is adding image content to a slide in a presentation application/service. The configuration data may indicate that a design suggestion for re-arranging the image content on the slide may need to be provided within 2 seconds after the user places the image content on the slide. The scheduler 104 may analyze the configuration data to determine a grouping of image recognition models that are able to return results in a time frame that enables a suggestion to be generated and provided to the user. In some instances, this analysis may comprise selecting an optimal device configuration for execution of models selected for the default batch 110, for example, to meet time-specific processing requirements. Results from image recognition processing by the image recognition models of the default batch 110 may be propagated for aggregation, where the scheduler 104 may utilize aggregate image recognition results 116 to generate suggestions for image content (e.g., usage of the image content through an application/service). In examples, where image recognition models are being tuned, retired from usage, etc., the image recognition models may no longer be selectable for execution in the default batch 110.

The wait batch 112 is a grouping of one or more image recognition models that are not prioritized for image recognition processing. The wait batch 112 is a grouping of one or more image recognition models that may be optional to run in an application-specific scenario. In another instance, image recognition models assigned to the wait batch 112 may be image recognition models that are in the process of being fine-tuned and/or tested. Ideally, the scheduler 104 would like to receive image recognition results from all image recognition models but processing of some image recognition models may be wait-listed based on application-specific scenarios where image recognition results may need to be returned in a specific time period or with a certain threshold level of accuracy in the results. The image recognition models that are selected for the wait batch 112 may vary based on the application-specific scenario that is detected. The configuration data may be analyzed to select image recognition models that are to be included in the wait batch 112. In examples where image recognition results are returned faster than expected for image recognition processing of the default batch 110, the image recognition pipeline is configured to propagate image content (and prior obtained image recognition results) to image recognition models in the wait batch 112 for additional image recognition processing. This may enable the scheduler 104 to obtain richer image recognition results and therefore improve generation of suggestions for image content. In some examples, image recognition results determined from analysis using models of the default batch 110 may be propagated as inputs to the wait batch 112 to aid the processing efficiency thereof. In some alternative examples, the scheduler 104 is configured to propagate the image content to the image recognition models selected for the wait batch 112, where image recognition processing may be executed in parallel with processing by the default batch 110. However, the scheduler 104 may not wait for image recognition results from processing via the wait batch 112 before a suggestion for image content is generated. In examples where image recognition results are received from both the default batch 110 and the wait batch 112, the scheduler 104 may utilize aggregate image recognition results 116, from both batches, to generate suggestions for image content (e.g., usage of the image content through an application/service).

The dark batch 114 is a grouping of one or more image recognition models that either: 1) execute image recognition processing that evaluates attributes which are less likely to impact a user experience (e.g., image borders, shadowing); and 2) require performance evaluation (e.g., initial versions of models or untested models). In further examples, image recognition models that may be included within the dark batch 114 may comprise models where image recognition results do not meet latency requirements of other batches (e.g., application-specific time requirements for retrieving image recognition results). The dark batch 114 are image recognition models that may not be prioritized for provision of initial image recognition results (e.g., used to generate suggestions for image content). Image recognition models included in the dark batch 114 may be those which are heavier, slower, unstable, new/untested, etc., and ultimately take longer to complete execution. Ideally, the scheduler 104 would like to receive image recognition results from all image recognition models but processing of some image recognition models may be de-prioritized for the sake of processing efficiency for return of image recognition results. In one example, image content may be propagated to the image recognition models in the dark batch 114 in parallel with propagation of the image content to the default batch 110. In other examples, image recognition processing using models of the dark batch 114 may be delayed so that processing initiates after image recognition results have been received from the default batch 110 and/or the wait batch 112.

In further examples, image recognition processing in the dark batch 114 may occur offline and utilized to tune image recognition modeling to enhance real-time implementation. For instance, results from image recognition processing via a dark batch 114 of image recognition models may be aggregated as log file data 118, which may be utilized for offline investigation. Offline investigation may comprise processing that tunes operation by the scheduler 104 including selection of models for batch division and optimized device configurations for application-specific scenarios and/or tuning of specific image recognition models. Offline investigation may comprise processing to optimize image recognition processing at run-time including: performance evaluation including tuning image recognition models for availability to different batch classifications; detecting processing times/latency for specific image recognition modeling when running different system configurations; determining whether to prioritize/de-prioritize image recognition modeling for different application-specific scenarios; image recognition labeling to assist with run-time implementation; identification of a corpus of training data to assist with optimization of image recognition models over time; identifying user preferences for generation of suggestions based on usage patterns of image content, among other examples.

As identified in the foregoing description, the scheduler 104 may further select a device configuration to execute respective batches of image recognition models. Device configurations may be selected based on evaluation of configuration data for the image recognition pipeline so that image recognition processing is optimized for application-specific scenarios. Device configurations may be dynamically adapted to account for infrastructure resources of an application platform. For example, the scheduler 104 may be simultaneously handling image recognition processing for a plurality of different applications/services, where computational resources are required to be spread out across available devices to maintain efficient processing. In doing so, the scheduler 104 is configured to implement intra-worker parallelism, where one machine (worker) can serve multiple deep models at the same time together with other image data analyzers. For example, image recognition models in a specified batch may be executed using the same device/machine. This can aid processing efficiency where models, evaluating different attributes can be grouped together and run on the same device for a comprehensive and efficient processing result. As an example, a first device may execute image recognition processing for image recognition models of the default batch 110; a second device may execute image recognition processing for image recognition models of the wait batch 112; and a third device may execute image recognition processing for image recognition models of the dark batch 114.

The scheduler 104 may manage available resources and processing workloads. In examples where there exists a larger amount of image recognition models that are to be served by one machine, that machine becomes slow as it is bogged down with a heavier workload. Hence, the scheduler 104 is configured to dynamically implement concepts of inter-worker parallelism, where processing loads for the deep learning models and IAS analyzers can be split and spread across multiple machines for inter-worker parallel computing. The split is dynamically controlled by the scheduler 104 and can be adjusted without checking code and build data for the scheduler 104. Additionally, device configurations may be modified dynamically. Configuration file data may be maintained that identified latency for processing by image recognition models. If run-time execution falls behind estimated latency requirements, device configurations may need to be adapted (e.g., new machine added to take on some of the processing load) or retired (e.g., stopped from processing). In some examples, the scheduler 104 may be trained to pre-configure a device configuration for application-specific processing, where the pre-configured device configuration may be repeatedly utilized to retrieve image recognition results and generate suggestions based on the retrieved image recognition results.

Moreover, the scheduler 104 may further be optimized for run-time implementation. For example, selected device configurations may be warmed up by executing pseudo inputs right after the image recognition models are loaded. This may significantly accelerate the first few iterations of image recognition processing. Additionally, the scheduler 104 is configured to share preprocessed image data from its memory stream to aid in image recognition processing by other models. In some instances, user image files may not be accessible due to compliance requirements, so image content may be stored in a memory stream across production machines. Additionally, image content may be preprocessed (e.g., resized using certain resizing algorithm) to aid in subsequent image recognition processing. As deep learning models can have the same image inputs, the preprocessed images may be shared amongst image recognition models that have the same input size and/or across different devices.

The scheduler 104 may be further configured to analyze image recognition results (e.g., aggregate image recognition results 116) from one or more batches of image recognition models. In doing so, the scheduler 104 may implement machine learning modeling that is trained and configured to evaluate image recognition results and rank applicable image recognition results for application-specific context. For example, image recognition results related to features such as objects identification, size of the image, shape of the image, facial recognition, etc., may be relevant in different application-specific scenarios to enable the scheduler 104 to interface with applications/services 120 for the generation of suggestions related to the image content. Ranking processing and associated machine learning modeling is known to one skilled in the field of art.

Application-specific parameters (e.g., identified in the configuration data) and/or signal data received from an application/service 120 may be utilized to generate image recognition suggestions. In some alternative examples, the scheduler 104 is configured to propagate the image recognition results directly to an application/service 120, which may take charge with creation of suggestions for image content. For example, the scheduler 104 may receive image recognition results (e.g., aggregate image recognition results 116), annotate the image recognition results based on ranking processing and then propagate the annotated image recognition results to the application/service 120. In such instances, the application/service 120 may generate suggestions for the image content. In any case, non-limiting examples of suggestions for the image content comprise but are not limited to: design suggestions for formatting, layout, presentation, etc., of the image content; contextual suggestions recommendations related to identified objects, persons, etc., within the image content; suggestions for correlation of image content with other content of an application/service; suggestions for sharing image content with other users; suggestions to transform the image content to a different state (e.g., rich data object); suggestions for posting the image content; and suggestions for annotating image content, among other examples. The scheduler 104 may be further configured to interface with applications/services 120 to display generated suggestions through a user interface. In some examples, a user interface may be a user interface of an application/service that is using the image content. In other examples, the scheduler 104 may be configured to provide a suggestion through a user interface of a different application/service, through a different device modality, etc. This may occur based on detected user preferences, initiation of new instances of applications/services (e.g., a message is received from another user through a different modality); identified application-specific parameters; and/or a combination thereof, among other examples.

Figure 2:
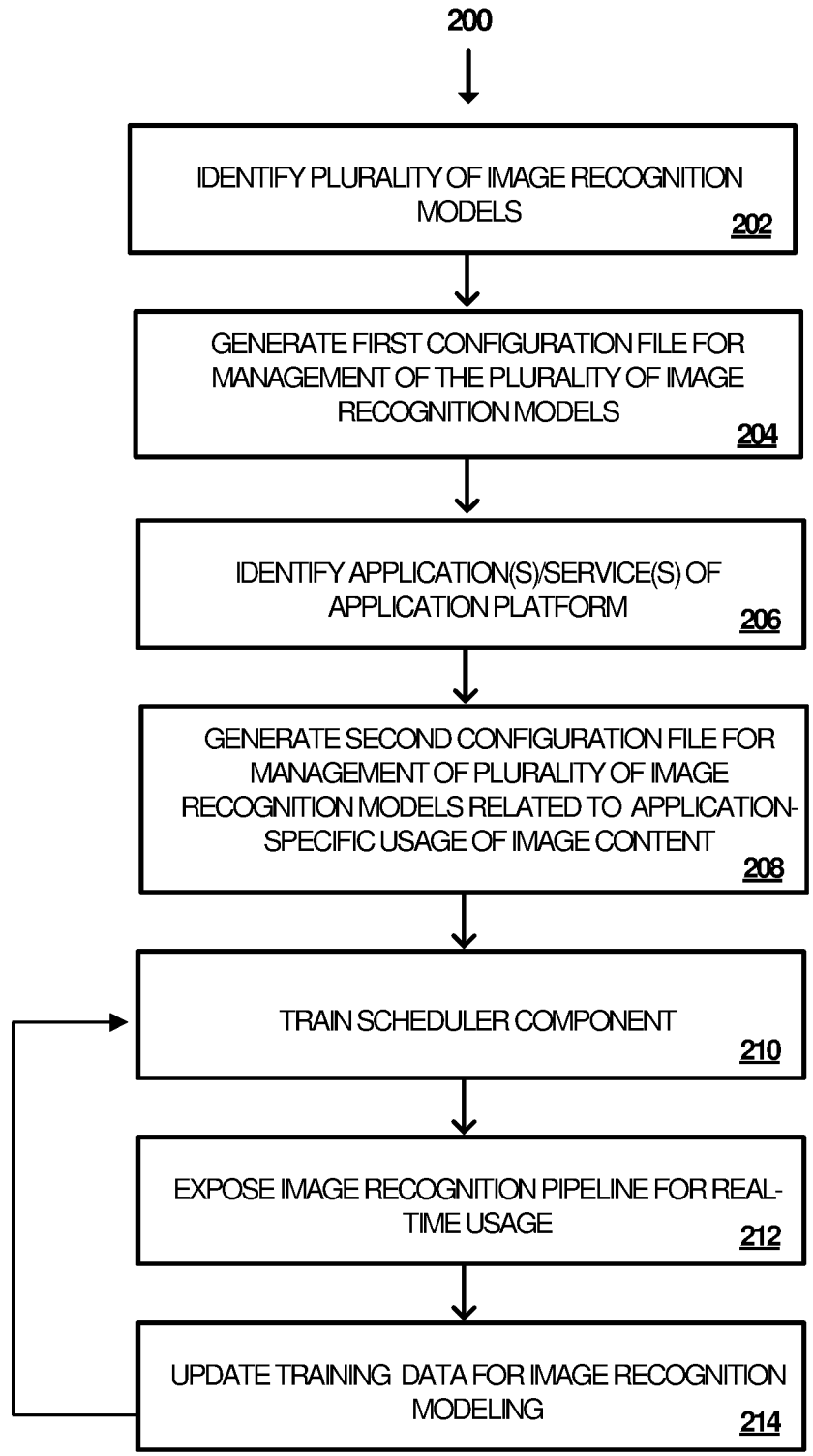
FIG. 2 illustrates an exemplary method related to generation of an exemplary image recognition pipeline, with which aspects of the present disclosure may be practiced.

FIG. 2 illustrates an exemplary method 200 related to generation of an exemplary image recognition pipeline, with which aspects of the present disclosure may be practiced. Processing operations described in method 200 may be executed by components described in process flow 100 (FIG. 1), where the detailed description in process flow 100 supports and supplements the recited processing operations in respective methods. Interfacing and communication between exemplary components, such as those described in process flow 100, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure.

Figure 4:
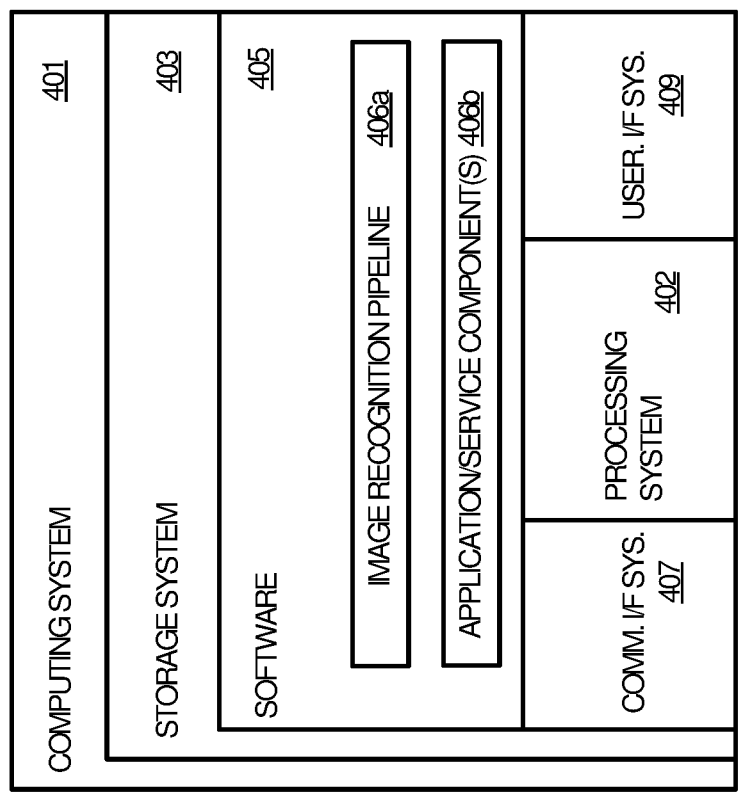
FIG. 4 illustrates a computing system suitable for implementing processing operations described herein related to management of an image recognition pipeline, with which aspects of the present disclosure may be practiced.

As an example, method 200 may be executed across an exemplary computing system (or computing systems) as described in the description of FIG. 4. Exemplary components, described in method 200, may be hardware and/or software components, which are programmed to execute processing operations described herein. Operations performed in method 200 may correspond to operations executed by a system and/or service that execute computer programs, software agents, intelligent bots, application programming interfaces (APIs), neural networks and/or machine-learning processing, among other examples. In some examples, processing operations described in method 200 may be executed by one or more applications/services associated with a web service that has access to a plurality of application/services, devices, knowledge resources, etc. In one instance, processing operations described in method 200 may be implemented by one or more components connected over a distributed network.

Method 200 begins at processing operation 202, where a plurality of image recognition models is identified. Examples of image recognition models including IAS modeling, deep learning modeling and/or a combination thereof, has been described in the foregoing description (e.g., image recognition modeling 102 of FIG. 1). An exemplary image recognition pipeline may be continuously updated with new image recognition models, where a state of the image recognition models may be changed based on performance evaluation, training, availability (e.g., add/removing specific models) and application-specific preferences/prioritization of models, among other examples.

Based on a state of the plurality of image recognition models, a first configuration file for management of the plurality of image recognition models may be generated (processing operation 204). An example of a first configuration file is configuration file A 106 (of FIG. 1). Examples of data managed by configuration file A 106 has been described in the foregoing description. The first configuration file, generated in processing operation 204, may be utilized by the image recognition pipeline to manage access to image recognition modeling during scheduling events executed by a scheduling component (e.g., scheduler 104 of FIG. 1) as described in the foregoing description. In at least one example, the first configuration file is utilized to load data for image recognition models for run-time execution of the image recognition pipeline.

Flow of method 200 may proceed to processing operation 206, where applications/services of an application platform are identified for interfacing with the image recognition pipeline. Examples of an application platform as well as applications/services have been provided in the foregoing description. At processing operation 208, a second configuration file is generated. The image recognition pipeline may be configured to interface with a plurality of different applications/services, to foster interaction with image content through the provision of image recognition analysis for generation of content suggestions. The second configuration file comprises data for management of the plurality of image recognition models related to application-specific usage of image content. Application-specific usage of image content comprises examples where a user is accessing/using image content in real-time (or near real-time) as well as instances where offline evaluation occurs of previous usage of image content through an application/service. Among other types of data, the second configuration file may comprise application-specific parameters that may be correlated with data of the first configuration file to assist a scheduler component with batch selection of image recognition models and selection of device configurations for execution of image recognition processing of selected batches.

At processing operation 210, a scheduler component of the image recognition pipeline is trained. Training of the scheduler may comprise training of machine learning modeling to determine which image recognition models to run (e.g., default batch processing), which models work best in application-specific scenarios, which models need fine tuning (e.g., wait batch processing), which models need a dark run (e.g., dark batch processing), the division of the image recognition models for inter-/intra-machine parallelism, optimal device configurations, model retirement and update, percentage of users to try a new model for experiment, algorithms and settings for resizing image content, among other examples. Management of machine learning modeling including training of machine learning modeling is known to one skilled in the field of art. In present examples, machines learning modeling is specifically trained above traditional modeling based on specific training data and applicable parameters for scheduling processing operations describe herein.

Training processing (processing operation 210) may further comprise execution of performance monitoring for image recognition modeling. Examples of attributes evaluated during performance monitor comprise: success/failures of image recognition processing, accuracy determinations, distributed inference of latency for specific models; metrics related to usage of specific models in application-specific scenarios; evaluation of iterations of image recognition models; and metrics related to performance of models in specific batches, among other examples. Performance evaluation may help fine-tune models for run-time execution including finding a bottleneck (e.g., the slowest model), where that model can be re-trained to improve overall latency during image recognition processing. Additional training may comprise overall evaluation of scheduling efficiency and continuous support for fine-tuning aggregate integration of image recognition models into batches. Non-limiting examples of such types of evaluation comprise but are not limited to: A/B analysis, ranker experiments, cross-analyzer evaluation and other types of statistical classification (including supervised and unsupervised learning).

Flow of method 200, may proceed to processing operation, 212 where the image recognition pipeline is exposed for real-time (or near real-time usage). In some examples, operation 212 may comprise operations including pre-loading configuration data for image recognition processing; executing listening/detection of usage of image content in specific applications/services, enabling developers to add/remove image recognition models and enabling interfacing with applications/services for extensible integration of the image recognition pipeline. An exposed image recognition pipeline may be continuously updated. For example, an update (processing operation 214) of available training data may occur that enables the image recognition pipeline to be re-optimized. In such instances, processing of method 200 may return to processing operation 210, where the scheduler component may be re-trained. A re-trained or updated image recognition pipeline is then re-exposed for real-time (or near real-time usage).

Figure 3:
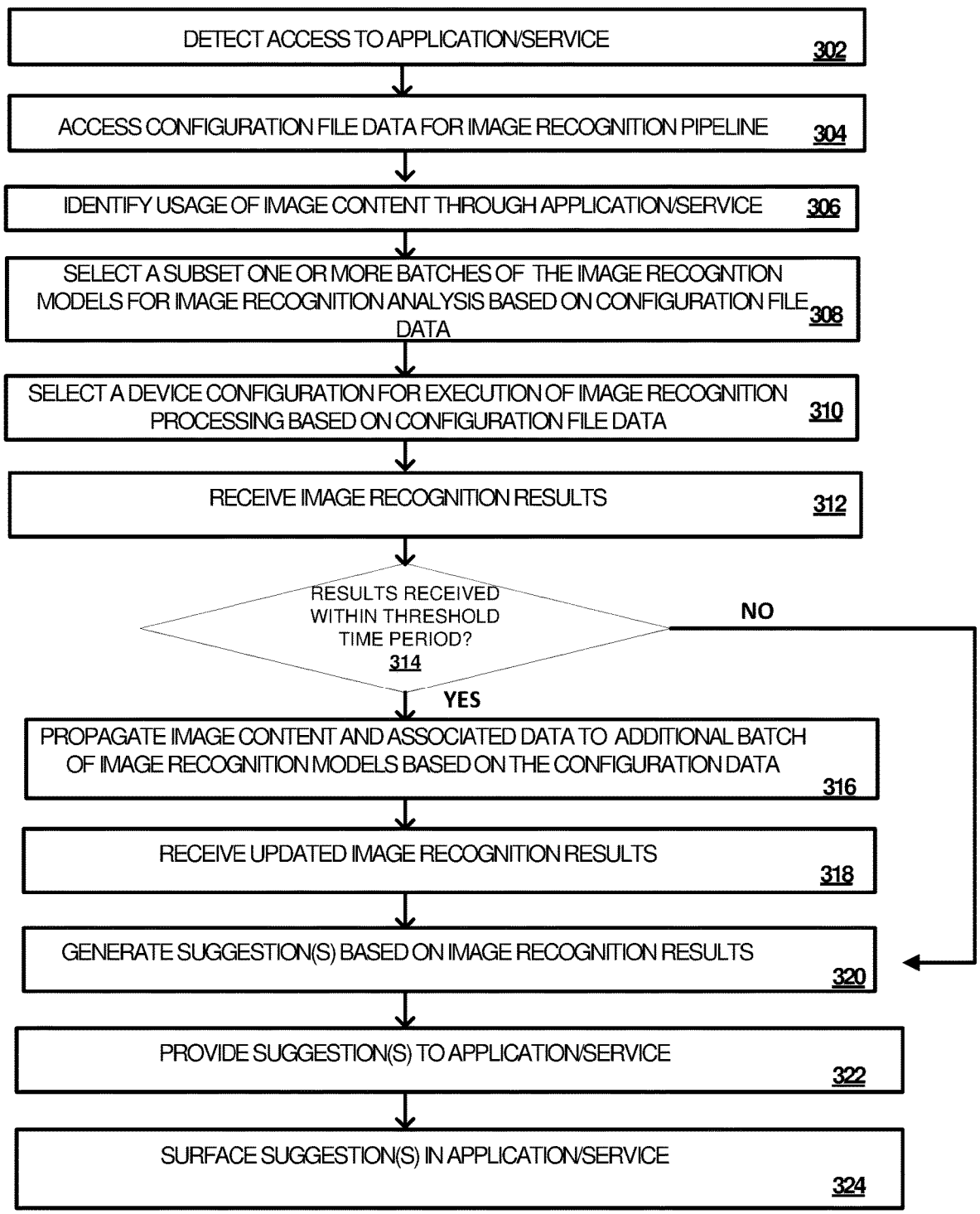
FIG. 3 illustrates an exemplary method related to usage of an image recognition pipeline to manage image recognition processing, with which aspects of the present disclosure may be practiced.

FIG. 3 illustrates an exemplary method 300 related to usage of an image recognition pipeline to manage image recognition processing, with which aspects of the present disclosure may be practiced. Processing operations described in method 300 may be executed by components described in process flow 100 (FIG. 1), where the detailed description in process flow 100 supports and supplements the recited processing operations in respective methods. Interfacing and communication between exemplary components, such as those described in process flow 100, are known to one skilled in the field of art. For example, data requests and responses may be transmitted between applications/services to enable specific applications/services to process data retrieved from other applications/services. Formatting for such communication may vary according to programmed protocols implemented by developers without departing from the spirit of this disclosure.

As an example, method 300 may be executed across an exemplary computing system (or computing systems) as described in the description of FIG. 4. Exemplary components, described in method 300, may be hardware and/or software components, which are programmed to execute processing operations described herein. Operations performed in method 300 may correspond to operations executed by a system and/or service that execute computer programs, software agents, intelligent bots, application programming interfaces (APIs), neural networks and/or machine-learning processing, among other examples. In some examples, processing operations described in method 300 may be executed by one or more applications/services associated with a web service that has access to a plurality of application/services, devices, knowledge resources, etc. In one instance, processing operations described in method 300 may be implemented by one or more components connected over a distributed network.

Method 300 begins at processing operation 302, where access is detected to an application/service. An exemplary image recognition pipeline may be configured to interface with applications/services to provide image recognition support. In some examples, the image recognition pipeline may utilize detection of access to an application/service as a trigger to preload data for subsequent real-time processing.

Flow of method 300 may proceed to processing operation 304, where a scheduler of the image recognition pipeline may access configuration file data. As described in the foregoing description, configuration file data may be utilized to optimize image recognition processing at run-time in application-specific scenarios, where a scheduling component (e.g., scheduler 104 of FIG. 1) may select batch division of image recognition models for implementing image recognition processing as well as select an optimal device configuration, from available computing resources, to execute the image recognition processing. Access through an application/service may be a trigger for initiation of processing by a scheduler to access configuration file data so that processing operations are expedited to reduce latency during real-time processing. In alternative examples, configuration file data may be accessed in offline examples and queued up for execution in real-time situations, where applications-specific training may optimize a scheduler to implement specific batch divisions and device configurations when a user is working with image content in a specific application/service. Examples of configuration data for an image recognition pipeline have been described in the foregoing description. In one example, a first configuration file is accessed that provides data comprising data for managing the plurality of image recognition models. In further examples, a second configuration file is accessed providing data that comprises application-specific parameters for image recognition analysis. A scheduling component may utilize the first configuration file and the second configuration file to select subsets of image recognition models for batch execution as well as select an optimal device configuration for selected batch execution.

At processing operation 306, usage of image content is identified through an application/service. Detection (processing operation 306) of usage of image content through an application/service may be a trigger for initiation of scheduling operation processing by a scheduling component of the image recognition pipeline. For example, a user may add, create or otherwise modify image content through a user interface of an application/service, which may initiate operations to select subsets of image recognition models for batch execution as well as select an optimal device configuration for selected batch execution for the application-specific access.

Flow may proceed to processing operation 308, where a subset of one or more image recognition models is selected for image recognition analysis. Operations for batch division of image recognition modeling has been described in the foregoing description. In one example, a subset of the image recognition models for batch execution is selected based on application-specific parameters identified in the configuration data for an application or service and/or results of training processing. For instance, configuration file data may be correlated where a subset of the image recognition models is selected for batch execution based on a timing requirement associated with the application or service and a latency for execution of individual image recognition models. Other types of data that may influence segregation of image recognition models into various batches has been described in the foregoing description including the description of process flow 100 (FIG. 1).

Furthermore, an optimal device configuration for batch execution of the image recognition modeling may be selected (processing operation 310). Operations for selection of device configurations for execution of the image recognition modeling has been described in the foregoing description including the description of process flow 100 (FIG. 1). As an example, selection of a device configuration may comprise evaluation of the configuration data and/or results of training processing. Once an optical batch distribution is created and an optimal device configuration is selected, the scheduling content may propagate the image content for image recognition processing according to the determinations made by the scheduling component. In some examples, the image recognition pipeline may be configured to execute image recognition processing. In other examples, the image recognition pipeline interfaces with other applications/services and/or devices that are configured to execute image recognition processing. As identified in the foregoing, the scheduling component may schedule batch execution of image recognition modeling to occur in an order (e.g., one after another), in parallel, in part (e.g., partially stopped due to inefficient processing) or not at all (e.g., in instances where image recognition results have already been retrieved and computational resources are not required to execute additional processing).

In any example, results of the image recognition processing are received (processing operation 312). Flow of method 300 may proceed to decision operation 314, where it is determined whether image recognition results have been received within a threshold time period. As described in the foregoing description, a scheduling component of the image recognition pipeline may control batch execution of image recognition analysis, where certain application-specific scenarios may have time requirements for returning suggestions to assist with a user task at hand. For example, a default batch of image recognition models may be implemented to generate image recognition results. In instances where such processing is executed efficiently and the scheduler has enough time to execute additional processing according to specified time requirements, flow of decision operation 314 may branch YES and the scheduling component may propagate (processing operation 316) the image content (and associated signal data) for subsequent batch processing (e.g., a wait batch and/or dark batch). As identified in the foregoing description, inputs and associated data related to prior iterations of image recognition processing may be propagated to assist with the efficiency in execution of downstream batch execution. Updated image recognition results may be received (processing operation 318) based on subsequent batch processing. Flow of method 300 may then proceed to processing operation 320. In some examples, the scheduler component may execute a determination that it cannot wait for image recognition results to be retrieved from specific batch processing. This may occur in some scenarios where time requirements are not met for retrieval of image recognition results and/or generation of suggestions from the image recognition results. In such instances, the scheduler component can stop processing or continue processing offline to use that run iteration to fine-tune subsequent operation.

In examples, where image recognition processing results have not been received within a threshold time period, flow of decision operation 314 branches NO and processing of method 300 proceeds directly to processing operation 320. In any example, processing operation 320 comprises generation of suggestions for image content (e.g., the usage of the image content through an application/service) based on the image recognition results. Image recognition results may be aggregate image recognition results that comprise results from processing by a plurality of image recognition models (in a single batch or multiple batches). Processing for generation of suggestions from image recognition results has been described in the foregoing description. Non-limiting examples of suggestions for the image content comprise but are not limited to: design suggestions for formatting, layout, presentation, etc., of the image content; contextual suggestions recommendations related to identified objects, persons, etc., within the image content; suggestions for correlation of image content with other content of an application/service; suggestions for sharing image content with other users; suggestions to transform the image content to a different state (e.g., rich data object); suggestions for posting the image content; and suggestions for annotating image content, among other examples.

Flow of method 300 may proceed to processing operation 322, where generated suggestions for image content are provided to an application/service (e.g., application/service utilized to access the image content). The image recognition pipeline may be further configured to interface with applications/services to surface (processing operation 324) generated suggestion through a user interface. In some examples, a user interface may be a user interface of an application/service that is using the image content. In other examples, a scheduler component of the image recognition pipeline may be configured to provide a suggestion through a user interface of a different application/service, through a different device modality, etc. This may occur based on detected user preferences, initiation of new instances of applications/services (e.g., a message is received from another user through a different modality); identified application-specific parameters; and/or a combination thereof, among other examples.

FIG. 4 illustrates a computing system suitable for implementing processing operations described herein related to management of an image recognition pipeline, with which aspects of the present disclosure may be practiced. Computing system 401, which is representative of any system or collection of systems in which the various applications, services, scenarios, and processes disclosed herein may be implemented. Examples of computing system 401 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, portable electronic devices, smart televisions, smart watches and other wearable devices, as well as any variation or combination thereof.

Computing system 401 may be implemented as a single apparatus, system, or device or may be implemented in a distributed manner as multiple apparatuses, systems, or devices. For example, computing system 401 may comprise one or more computing devices that execute processing for applications and/or services over a distributed network to enable execution of processing operations described herein over one or more services. Computing system 401 may comprise a collection of devices executing processing for front-end applications/services, back-end applications/service or a combination thereof. Computing system 401 comprises, but is not limited to, processing system 402, storage system 403, software 405, communication interface system 407, and user interface system 409. Processing system 402 is operatively coupled with storage system 403, communication interface system 407, and user interface system 409. Processing system 402 loads and executes software 405 from storage system 403. Software 405 includes one or more software components (e.g., 406a and 406b) that are configured as components for the image recognition pipeline 406a and application/service components 406(b) (e.g., application platform, productivity application/service components). Examples of such components, including executable processing operations, have been described in the foregoing description. In some examples, computing system 401 may be a computing device that a user utilizes to access content and/or connect to an electronic meeting. Computing system 401 may be configured for provision of an adapted user interface, that is improved over traditional user interfaces, where a user interface may be tailored to enable proactive suggestions for sharing of meeting content as described herein. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity.

Referring still to FIG. 4, processing system 402 may comprise processor, a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, graphical processing units, application specific processors, and logic devices, as well as any other type of processing device, combinations, or variations thereof.

Storage system 403 may comprise any computer readable storage media readable by processing system 402 and capable of storing software 405. Storage system 403 may include volatile and nonvolatile, removable and non-removable media implemented in any method or technology for storage of information, such as computer readable instructions, data structures, program modules, cache memory or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for implementing software components, hardware components or a combination thereof. In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized implement an exemplary image recognition pipeline 406a and/or other application/service components 406b, as described herein. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Communication interface system 407 may also be utilized to cover interfacing between processing components described herein. Examples of connections and devices that together allow for inter-system communication may include network interface cards or devices, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface, for example, that enables front-end processing of exemplary application/services described herein (including productivity applications/services).

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:
1. A method comprising:
    detecting, through an image recognition pipeline service interfacing with a productivity application or service that is configured to provide access to content, a usage of image content through the productivity application or service;

in response to detecting access to the image content through the productivity application or service, loading configuration data for the image recognition pipeline service;

generating an application-specific configuration for image recognition processing of the image content, wherein the generating of the application-specific configuration comprises execution of processing operations that:

select, from a plurality of available image recognition models provided through the image recognition pipeline service, a subset of the available image recognition models based on application-specific parameters identified in the configuration data for the productivity application or service, and select a device configuration for execution of image recognition processing of the image content based on analysis of the application-specific parameters identified in the configuration data for the productivity application or service;

propagating the image content for image recognition processing based on a selection of the subset of the available image recognition models and a selection of the device configuration;

receiving image recognition results for the image content; and generating a suggestion for the usage of the image content based on the image recognition results.

2. The method of claim 1, wherein the subset of the available image recognition models is selected based on a comparative analysis of a timing requirement, identified by the productivity application or service, for requiring return of the image recognition results and a latency estimation for execution of image recognition processing by individual image recognition models of the plurality of available image recognition models.

3. The method of claim 2, wherein the available image recognition models comprise a plurality of image analysis service (IAS) models configured to execute image recognition processing in a time period that satisfies a latency threshold and a plurality of deep learning models configured to execute image recognition processing in a time period that exceeds the latency threshold, and wherein the subset of the available image recognition models comprises a combination of one or more IAS models and one or more deep learning models.

4. The method of claim 3, further comprising:

detecting a processing time for retrieval of the image recognition results for the subset of available image recognition models; and in response to determining that the image recognition results are retrieved within a threshold time period that corresponds with the timing requirement identified by the productivity application or service, propagating the image content to a second subset of available image recognition models for image recognition processing.

5. The method of claim 3, further comprising; receiving image recognition results from the second subsequent of available image recognition models, and wherein the suggestion for the usage of the image content is generated based on the image recognition results received from the subset of available image recognition models and the image recognition results from the second subset of available image recognition models.

6. The method of claim 2, further comprising:

selecting, from the plurality of available image recognition models, a second subset of available image recognition models for image recognition processing; and propagating, through the image recognition pipeline service, the image content to the second subset of available image recognition models, wherein the image recognition results from processing by the second subset of available image recognition models is received after a threshold time period that corresponds with the timing requirement identified by the productivity application or service.

7. The method of claim 1, further comprising: propagating the suggestion for usage of the image content to productivity application or service, and wherein the productivity application or service is configured to present, through a user interface, the suggestion for the usage of the image content.

8. The method of claim 1, wherein the configuration data comprises:

a first configuration file providing data that comprises data for managing the plurality of available image recognition models; and a second configuration file providing data that comprises application-specific parameters associated with the productivity application or service, and wherein a scheduling component of the image recognition pipeline service utilizes the first configuration file and the second configuration file to select the subset of available image recognition models and select the device configuration.

9. A system comprising:

at least one processor; and a memory, operatively connected with the at least one processor, storing computer-executable instructions that, when executed by the at least one processor, causes the at least one processor to execute a method that comprises:

detecting, through an image recognition pipeline service interfacing with a productivity application or service that is configured to provide access to content, a usage of image content through the productivity application or service;

in response to detecting access to the image content through the productivity application or service, loading configuration data for the image recognition pipeline service;

generating an application-specific configuration for image recognition processing of the image content, wherein the generating of the application-specific configuration comprises execution of processing operations that:

select, from a plurality of available image recognition models provided through the image recognition pipeline service, a subset of the available image recognition models based on application-specific parameters identified in the configuration data for the productivity application or service, and select a device configuration for execution of image recognition processing of the image content based on analysis of the application-specific parameters identified in the configuration data for the productivity application or service;

propagating the image content for image recognition processing based on a selection of the subset of the available image recognition models and a selection of the device configuration;

receiving image recognition results for the image content; and generating a suggestion for the usage of the image content based on the image recognition results.

10. The system of claim 9, wherein the subset of the available image recognition models is selected based on a comparative analysis of a timing requirement, identified by the productivity application or service, for requiring return of the image recognition results and a latency estimation for execution of image recognition processing by individual image recognition models of the plurality of available image recognition models.

11. The system of claim 10, wherein the available image recognition models comprise a plurality of image analysis service (IAS) models configured to execute image recognition processing in a time period that satisfies a latency threshold and a plurality of deep learning models configured to execute image recognition processing in a time period that exceeds the latency threshold, and wherein the subset of the available image recognition models comprises a combination of one or more IAS models and one or more deep learning models.

12. The system of claim 11, wherein the method, executed by the at least one processor, further comprises:
   detecting a processing time for retrieval of the image recognition results for the subset of available image recognition models; and
   in response to determining that the image recognition results are retrieved within a threshold time period that corresponds with the timing requirement identified by the productivity application or service, propagating the image content to a second subset of available image recognition models for image recognition processing.

13. The system of claim 12, wherein the method, executed by the at least one processor, further comprises: receiving image recognition results from the second subsequent of available image recognition models, and wherein the suggestion for the usage of the image content is generated based on the image recognition results received from the subset of available image recognition models and the image recognition results from the second subset of available image recognition models.

14. The system of claim 10, wherein the method, executed by the at least one processor, further comprises:
   selecting, from the plurality of available image recognition models, a second subset of available image recognition models for image recognition processing; and
   propagating, through the image recognition pipeline service, the image content to the second subset of available image recognition models, wherein the image recognition results from processing by the second subset of available image recognition models is received after a threshold time period that corresponds with the timing requirement identified by the productivity application or service.

15. The system of claim 9, wherein the method, executed by the at least one processor, further comprises: propagating the suggestion for usage of the image content to productivity application or service, and wherein the productivity application or service is configured to present, through a user interface, the suggestion for the usage of the image content.

16. The system of claim 9, wherein the configuration data comprises:
   a first configuration file providing data that comprises data for managing the plurality of available image recognition models; and a second configuration file providing data that comprises application-specific parameters associated with the productivity application or service, and wherein a scheduling component of the image recognition pipeline service utilizes the first configuration file and the second configuration file to select the subset of available image recognition models and select the device configuration.

17. A computer-readable storage media storing computer-executable instructions that, when executed by at least one processor, causes the at least one processor to execute a method comprising:
   detecting, through an image recognition pipeline service interfacing with a productivity application or service that is configured to provide access to content, a usage of image content through the productivity application or service;
   in response to detecting access to the image content through the productivity application or service, loading configuration data for the image recognition pipeline service;
   generating an application-specific configuration for image recognition processing of the image content, wherein the generating of the application-specific configuration comprises execution of processing operations that:
      select, from a plurality of available image recognition models provided through the image recognition pipeline service, a subset of the available image recognition models based on application-specific parameters identified in the configuration data for the productivity application or service, and
      select a device configuration for execution of image recognition processing of the image content based on analysis of the application-specific parameters identified in the configuration data for the productivity application or service;
   propagating the image content for image recognition processing based on a selection of the subset of the available image recognition models and a selection of the device configuration;
   receiving image recognition results for the image content; and
   generating a suggestion for the usage of the image content based on the image recognition results.

18. The computer-readable storage media of claim 17, wherein the subset of the available image recognition models is selected based on a comparative analysis of a timing requirement, identified by the productivity application or service, for requiring return of the image recognition results and a latency estimation for execution of image recognition processing by individual image recognition models of the plurality of available image recognition models.

19. The computer-readable storage media of claim 17, wherein the executed method further comprising:
   detecting a processing time for retrieval of the image recognition results for the subset of available image recognition models; and
   in response to determining that the image recognition results are retrieved within a threshold time period that corresponds with the timing requirement identified by the productivity application or service, propagating the image content to a second subset of available image recognition models for image recognition processing; and
   receiving image recognition results from the second subsequent of image recognition models, and wherein the suggestion for the usage of the image content is generated based on the image recognition results received from the subset of image recognition models and the image recognition results from the second subset of image recognition models.

20. The computer-readable storage media of claim 17, wherein the configuration data comprises: a first configuration file providing data that comprises data for managing the plurality of available image recognition models; and a second configuration file providing data that comprises application-specific parameters associated with the productivity application or service, and wherein a scheduling component of the image recognition pipeline service utilizes the first configuration file and the second configuration file to select the subset of available image recognition models and select the device configuration.

* * * * *